Patented Mar. 19, 1946

UNITED STATES PATENT OFFICE

2,396,937

AMYLACEOUS DERIVATIVES

Hans F. Bauer, Chicago, Jordan V. Bauer, Elmwood Park, and Don M. Hawley, Geneva, Ill., assignors, by mesne assignments, to Stein, Hall & Co., Inc., a corporation of New York No Drawing. Application October 4, 1940, Serial No. 359,697

16 Claims. (Cl. 260—209)

This invention relates to new and useful amylaceous derivatives and a new and improved method for the production thereof.

One of the objects of the invention is to produce a new and improved starch product in which the individual granules of the product swell in cold water but do not dissolve or disperse to the extent that they lose their individual identity.

Another object of the invention is to provide an amylaceous product which does not undergo substantial granular disorganization in either hot or cold water.

Still another object of the invention is to prepare a new and improved type of starch product having a wide variety of uses.

An additional object of the invention is to provide a new and improved method for preparing a starch product of the character described above. Other objects will appear hereinafter.

These objects are accomplished in accordance with this invention by treating a dextrine, or a starch conversion product, with an aldehyde compound such as formaldehyde, paraformaldehyde or acetaldehyde and then roasting the resultant reaction mixture at a relatively high temperature, preferably above 300° F. Formaldehyde or paraformaldehyde are preferred for our purpose because of their low cost and effectiveness.

The process may be carried out by starting with a dextrine or a starch gum such as a British gum, or by starting with a starch and converting it with or without an acid, then adding the formaldehyde compound and finally roasting. The period of roasting is such as to produce a product which will swell in cold water, and the time required will normally be about 2 to 4 hours at temperatures within the range of 300° F. to 340° F. If higher temperatures are used, relatively less time is required. The characteristics of the product may be varied by varying the time of roasting, and the type of starting material so that the final product will swell in cold water and form a soft paste in proportions by weight from about 0.5 part of the product per part of water to 16 parts of the product per part of water. The roasting is carried out under substantially dry conditions.

The products produced by this method of treatment differ markedly from ordinary starch or dextrine adhesives in that the individual granules of the product swell in cold water but do not dissolve or disperse to the extent that they lose their individual identity.

Apparently when dextrines or amylaceous gums are treated with formaldehyde in the manner disclosed, condensation takes place and the individual granules of dextrine lose their normal properties of dissolving or dispersing in hot or cold water and assume the property of swelling in water without substantial solubility.

It is desirable for the purpose of the invention to add the formaldehyde compound after the starch has been substantially degraded. If the acid, formaldehyde and non-degraded starch are all mixed together and the conversion is carried out at relatively high temperatures, say, 300° F., the product will become mushy in water but has no substantial adhesive properties. If the conversion is carried out long enough, the product will become dark in color and develop substantial adhesive properties, but it is unsuitable for the stronger types of adhesive applications and in many cases cannot be used because of its dark color. Furthermore, the properties are still markedly different from the properties of the products prepared in accordance with this invention. Accordingly, it appears to be important that the formaldehyde compound be added to a degraded starch or dextrine and that the conversion be carried out under substantially dry conditions at temperatures which are relatively high.

One of the principal advantages of the product prepared in accordance with this invention is that it may be applied to a moist surface in powdered form and the moisture in the surface to which it is applied will cause the product to adhere to the surface. Thereafter, the surface to which the powder has been applied, as, for example, a moving web of paper may be passed over hot rolls, or other similar drying apparatus, without sticking to such apparatus. The ordinary type of degenerated starch or dextrine, as, for instance, a high soluble dextrine, tends to stick to such hot surfaces and furthermore, it does not have the other properties of the product herein described.

The invention will be further illustrated but is not limited by the following examples, in which the quantities are stated in parts by weight unless otherwise indicated:

Example I

To 1000 parts of a white corn dextrine which was converted to a solubility of about 10% in water at 75° F. was added 5 parts of paraformaldehyde and the mixture roasted for 4 hours at a temperature within the range of 300° F. to 340° F. The white corn dextrine used is a type sold under the trade name of XO by Stein, Hall Manufacturing Company.

The resultant product swelled in cold water to form a soft paste at a temperature of about 70° F. to 75° F. when mixed in the proportions of 1 part of said product to 4 parts of water. The original dextrine before treatment with formaldehyde gave a fluid adhesive when cooked with two parts of water as contrasted with the more viscous and less highly dispersible final product.

In practising the invention starches and dextrines derived from wheat, rice, barley, corn, oats rye, potato, cassava, tapioca and sago, or from any other source, may be employed.

As already indicated, the formaldehyde compound, for instance, formaldehyde or paraformaldehyde, is added to a partially converted starch and for the purpose of the invention should not be added before the starch is partially converted. The degree to which the starch is converted before the formaldehyde is added may vary through a fairly wide range. For most purposes it is desirable to add the formaldehyde subsequent to that phase in the conversion where the starch starts to become partially soluble in water. The degree of solubility may vary rather widely, depending upon the results desired. The subsequent roasting of the partially converted partially soluble starch conversion product under substantially dry conditions will tend to reduce the solubles content of the starch conversion product. The temperature employed during this roasting, as previously indicated, should preferably be relatively high but insufficiently high to char the starch conversion product.

The cold water solubility of the amylaceous conversion product prior to the addition of the formaldehyde compound may vary rather widely and may be even as much as 100%, but for most purposes it is preferable that the amylaceous conversion product be converted into a state where its cold water solubility (at 75° F.) is less than 50% and the converted product is still light in color. The particular starting material used in Example I has a cold water solubility of about 10%. The preferred products obtained in accordance with the invention form short soft white pastes in cold water. If the conversion product is converted to a high solubility prior to the addition of the formaldehyde compound the resultant product will form a darker paste.

An example of a product of this type may be prepared as follows:

*Example II*

To 1000 parts tapioca British gum which was converted to a solubility of about 90% in water at 75° F. was added 10 parts paraformaldehyde and the mixture roasted for 3 hours at 340° F. The resultant product swelled in cold water to give soft pasty gel when mixed in the proportions of 1 part of the said product to 8 parts of water. The original British gum before treatment with the formaldehyde gave a fluid highly dispersed adhesive when cooked with 2 parts of water as contrasted with the relatively much more viscous and less highly dispersible final product. Furthermore, it was necessary to cook the original British gum with water to develop its adhesive properties, whereas, the final product would swell in either cold or hot water to form an adhesive gel or paste.

The white corn dextrine and the British gum referred to in Examples I and II are typical amylaceous conversion products, the preparation of which is well known to the art of dextrine manufacture. The final products, however, which are produced by the subsequent treatment with formaldehyde and heating are to our knowledge new and unique and possess novel properties which are highly desirable for certain applications.

It should be understood that in the commercial manufacture of our improved adhesive product any of the well known methods for the dry dextrinization or conversion of starch may be used. The essential requirement for our purposes is that the aldehyde be introduced subsequent to that phase of the converting process wherein the starch conversion product begins to assume thin boiling starch or dextrine characteristics.

The term "amylaceous conversion product" is employed herein to describe a degraded or partially degraded starch, as, for example, a dextrine or a starch gum. Dextrines are usually obtained by roasting or heating starch in the presence of acids. Starch gums are usually obtained by roasting or heating starch with very small amounts of acid catalysts as differentiated from dextrines which are formed by heating the starch with relatively large amounts of acid catalysts.

The products of the present invention may be used in coating, impregnating and sizing all types of fibrous materials including paper, cloth and similar materials. They may be used in conjunction with, or incorporated with other materials, including pigments, fillers, wetting agents, dispersing agents, plasticizing agents, suspending agents, adsorbing agents, or other auxiliary agents. Likewise, they may be used as binders for sand cores such as are used for foundry purposes.

The term "cold water solubility" as used herein refers to solubility in water at temperatures of around 75° F. The expression "hot water solubility" refers to solubility in water at temperatures up to about 212° F. or 100° C.

The expression "under substantially non-gelatinizing conditions" refers to the use of insufficient moisture and/or the use of insufficient pressure to destroy the starch structure. It is well known, for example, that the presence of say more than about 15%–20% added moisture will gelatinize or burst the starch granule when heated to temperatures of say, about 140° F. or above, the gelatinization temperature varying with different starches. Superatmospheric pressures may also be used to assist in bursting the starch granule. Dextrinized starches retain the original starch structure because they are made under "non-gelatinizing" conditions but they undergo substantial granular disintegration when dispersed in water, whereas, the products of the present invention retain their granular form.

Having thus described the invention, what we claim as new and desire to secure by Letters Patent of the United States is:

1. A granular, substantially ungelatinized, amylaceous reaction product formed by roasting a partially converted, at least partially cold water soluble amylaceous conversion product under substantially non-gelatinizing conditions with a minor proportion of an aldehyde selected from the group consisting of formaldehyde and acetaldehyde at a temperature above about 300 degrees F. but insufficiently high to char the resultant converted product until a product is obtained which swells and forms short, soft pastes in cold water without substantial granular disorganization.

2. A granular, substantially ungelatinized amylaceous reaction product formed by roasting a partially converted, at least partially cold water soluble amylaceous conversion product under substantially non-gelatinizing conditions with a minor proportion of a formaldehyde at temperatures above about 300° F. but insufficiently high to char the resultant conversion product until a product is obtained which swells and forms short, soft pastes in cold water without substantial granular disorganization.

3. A granular, substantially ungelatinized amylaceous reaction product formed by roasting an incompletely dextrinized starch conversion product having a substantial cold water solubility less than about 50% under substantially non-gelatinizing conditions with a minor proportion of a formaldehyde at temperatures above about 300° F. but insufficiently high to char the resultant conversion product until a product is obtained which swells and forms short, soft pastes in cold water without substantial granular disorganization.

4. A granular, substantially ungelatinized amylaceous reaction product formed by roasting an incompletely dextrinized starch conversion product having a substantial cold water solubility less than about 50% under substantially non-gelatinizing conditions with a minor proportion of a formaldehyde at temperatures within the range of about 300° F. to 340° F. until a product is obtained which swells and forms short, soft pastes in cold water without substantial granular disorganization.

5. A granular, substantially ungelatinized amylaceous reaction product formed by roasting an incompletely dextrinized starch conversion product having a substantial cold water solubility less than about 50% under substantially non-gelatinizing conditions with a minor proportion of paraformaldehyde at temperatures within the range of about 300° F. to 340° F. until a product is obtained which swells and forms short, soft pastes in cold water without substantial granular disorganization.

6. A granular, substantially ungelatinized amylaceous reaction product formed by roasting an incompletely dextrinized grain starch having substantial cold water solubility less than about 50% under substantially non-gelatinizing conditions with a minor proportion of a formaldehyde at temperatures above about 300° F. but insufficiently high to char the resultant conversion product until a product is obtained which swells to form short, soft pastes in water without substantial granular disorganization.

7. A granular, substantially ungelatinized amylaceous reaction product formed by roasting an incompletely dextrinized, partially cold water soluble corn starch conversion product under substantially non-gelatinizing conditions with a minor proportion of paraformaldehyde at temperatures within the range of about 300° F. to 340° F. until a product is obtained which swells and forms short, soft pastes in water without substantial granular disorganization.

8. The method of producing a granular, substantially ungelatinized amylaceous-aldehyde reaction product which comprises roasting an aldehyde selected from the group consisting of a formaldehyde and acetaldehyde and a partially converted, at least partially cold water soluble amylaceous conversion product under the influence of heat at temperatures above about 300 degrees F. but insufficiently high to char the resultant product and under substantially non-gelatinizing conditions until a product is formed which swells in cold and hot water without substantial granular disorganization.

9. The method of producing a granular, substantially ungelatinized amylaceous-aldehyde reaction product which comprises roasting an aldehyde selected from the group consisting of a formaldehyde and acetaldehyde and a partially cold water soluble amylaceous conversion product under the influence of heat at temperatures above about 300 degrees F. but insufficiently high to char the resultant product and under substantially non-gelatinizing conditions until a product is formed which swells in cold water to form short, soft pastes without substantial granular disorganization.

10. The method of producing a granular, substantially ungelatinized amylaceous-aldehyde reaction product which comprises roasting a partially converted, at least partially cold water soluble amylaceous conversion product under substantially non-gelatinizing conditions with a formaldehyde at temperatures above about 300° F. but insufficiently high to char the resultant conversion product until a product is obtained which swells and forms short, soft pastes in cold water without substantial granular disorganization.

11. The method of producing a granular, substantially ungelatinized amylaceous-aldehyde reaction product which comprises roasting a partially converted, at least partially cold water soluble amylaceous conversion product under substantially non-gelatinizing conditions with a formaldehyde at temperatures of about 300° F. to 340° F. until a product is obtained which swells and forms short, soft pastes in cold water.

12. A method of preparing a granular, substantially ungelatinized amylaceous-aldehyde reaction product which comprises roasting an incompletely dextrinized corn starch having a cold water solubility less than about 50% under substantially non-gelatinizing conditions with paraformaldehyde at temperatures within the range of about 300° F. to about 340° F. until a product is obtained which swells and forms short, soft pastes in cold water.

13. The product of roasting a major proportion of a partially water soluble, substantially ungelatinized starch conversion product with a minor proportion of a formaldehyde under the influence of heat at temperatures above about 300° F. and under substantially non-gelatinizing conditions, said product being a granular solid in substantially ungelatinized form which swells in cold and hot water without substantial granular disorganization and forms short soft pastes in water within the range of 0.5 to 16 parts of water per part of said product, said pastes being relatively more viscous and less highly dispersible than pastes made with the amylaceous conversion product before reaction with the formaldehyde.

14. A product as claimed in claim 13 in which the starch conversion product is derived from a root starch.

15. A product as claimed in claim 13 in which the starch conversion product is derived from a grain starch.

16. A process of preparing a new and improved amylaceous derivative in substantially ungelatinized granular form which comprises roasting a partially degraded, partially water soluble starch conversion product with a formaldehyde in solid form at temperatures within the range from about 300° F. to 340° F. but below the temperatures at which substantial charring occurs for a period of from about 2 to about 4 hours, and in the presence of insufficient moisture and at pressures insufficiently high to cause gelatinization.

HANS F. BAUER.
JORDAN V. BAUER.
DON M. HAWLEY.